United States Patent
Smedley et al.

(10) Patent No.: US 6,873,157 B2
(45) Date of Patent: Mar. 29, 2005

(54) METHOD OF AND SYSTEM FOR DETERMINING THE REMAINING ENERGY IN A METAL FUEL CELL

(75) Inventors: Stuart I. Smedley, Escondido, CA (US); Kenneth D. Vail, San Diego, CA (US); Charles M. Holmes, Escondido, CA (US)

(73) Assignee: Metallic Power, Inc., Carlsbad, CA (US)

( * ) Notice: Subject to any disclaimer, the term of this patent is extended or adjusted under 35 U.S.C. 154(b) by 336 days.

(21) Appl. No.: 10/117,705

(22) Filed: Apr. 4, 2002

(65) Prior Publication Data

US 2003/0190500 A1 Oct. 9, 2003

(51) Int. Cl.[7] .................. G01N 27/416; F17D 1/16; H01M 8/04
(52) U.S. Cl. ............... 324/432; 429/22; 137/14
(58) Field of Search .............. 324/434, 426–432; 429/22; 137/14; 204/404

(56) References Cited

U.S. PATENT DOCUMENTS

| | | | |
|---|---|---|---|
| 3,271,652 A | 9/1966 | Walz et al. | 320/130 |
| 3,440,098 A | 4/1969 | Stachurski | 429/69 |
| 3,451,851 A | 6/1969 | Stanimirovitch | 429/216 |
| 3,575,722 A | 4/1971 | Craig | 429/23 |
| 3,639,173 A | 2/1972 | Stachurski | 320/162 |
| 3,660,170 A | 5/1972 | Rampel | 429/347 |
| 3,663,298 A | 5/1972 | McCoy et al. | 429/27 |
| 3,716,413 A | 2/1973 | Eisner | 429/21 |
| 3,763,007 A | * 10/1973 | Seyl | 204/404 |
| 3,767,466 A | 10/1973 | McCoy et al. | 429/27 |
| 3,811,952 A | 5/1974 | Siwersson et al. | 429/10 |
| 3,847,671 A | 11/1974 | Leparulo et al. | 429/15 |
| 3,879,225 A | 4/1975 | Backhurst et al. | 429/122 |
| 3,887,400 A | 6/1975 | Doniat et al. | 429/15 |
| 3,902,918 A | 9/1975 | Pompon | 429/1 |
| 3,930,882 A | 1/1976 | Ohsawa et al. | 429/207 |
| 3,944,430 A | 3/1976 | Lee | 429/201 |
| 3,970,472 A | 7/1976 | Steffensen | 429/206 |
| 3,981,747 A | 9/1976 | Doniat et al. | 429/15 |
| 3,985,581 A | 10/1976 | Stachurski et al. | 429/51 |
| 4,074,028 A | 2/1978 | Will | 429/105 |
| 4,105,829 A | 8/1978 | Venero | 429/15 |
| 4,127,701 A | 11/1978 | Symons et al. | 429/19 |

(Continued)

FOREIGN PATENT DOCUMENTS

| | | |
|---|---|---|
| EP | 0568822 A2 | 11/1993 |
| EP | 0593198 A2 | 4/1994 |
| EP | 0755088 A2 | 1/1997 |
| FR | 2639767 | 11/1988 |
| FR | 2669775 | 11/1990 |
| JP | 51 49439 | 4/1976 |
| WO | WO 00/38260 | 6/2000 |

OTHER PUBLICATIONS

Appleby, A. J. et al.: *The C.G.E. Circulating Zinc/Air Battery: A Practical Vehicle Power Source*; Journal of Power Sources; 1976/1977; vol. 1; pp. 17–24.

(Continued)

*Primary Examiner*—Pia Tibbits
(74) *Attorney, Agent, or Firm*—Howrey Simon Arnold & White LLP

(57) ABSTRACT

A system for measuring available energy in a metal fuel cell is provided. The system comprises first componentry for measuring an electrical property of a mixture formed from one or more reaction products dissolved in a reaction medium. The electrical property may be such as to bear a known relationship with the concentration of the one or more reaction products. Using this known relationship, second componentry estimates the concentration of the one or more reaction products, and, responsive thereto, determines the available energy in the fuel cell.

9 Claims, 15 Drawing Sheets

U.S. PATENT DOCUMENTS

| | | | |
|---|---|---|---|
| 4,145,482 A | 3/1979 | von Benda | 429/27 |
| 4,147,839 A | 4/1979 | Solomon et al. | 429/15 |
| 4,172,924 A | 10/1979 | Warszawski | 429/15 |
| 4,198,475 A | 4/1980 | Zaromb | 429/15 |
| 4,218,521 A | 8/1980 | Putt et al. | 429/39 |
| 4,272,333 A | 6/1981 | Scott et al. | 205/144 |
| 4,287,273 A | 9/1981 | Harney et al. | 429/153 |
| 4,352,864 A | 10/1982 | Struthers | 429/18 |
| 4,415,636 A | 11/1983 | Charkey | 429/27 |
| 4,479,856 A | 10/1984 | Ando | 205/312 |
| 4,485,154 A | 11/1984 | Remick et al. | 429/14 |
| 4,563,403 A | 1/1986 | Julian | 429/207 |
| 4,730,153 A | 3/1988 | Breting et al. | 320/116 |
| 4,731,547 A | 3/1988 | Alenduff et al. | 307/85 |
| 4,802,100 A | 1/1989 | Aasen et al. | 700/288 |
| 4,828,939 A | 5/1989 | Turley et al. | 429/38 |
| 4,842,963 A | 6/1989 | Ross, Jr. | 429/21 |
| 4,855,030 A | 8/1989 | Miller | 204/212 |
| 4,950,561 A | 8/1990 | Niksa et al. | 429/27 |
| 5,006,424 A | 4/1991 | Evans et al. | 429/15 |
| 5,156,925 A | 10/1992 | Lapp | 429/19 |
| 5,168,905 A | 12/1992 | Phallen | 141/1 |
| 5,188,911 A | 2/1993 | Downing et al. | 429/70 |
| 5,196,275 A | 3/1993 | Goldman et al. | 429/27 |
| 5,208,526 A | 5/1993 | Goldman et al. | 320/128 |
| 5,260,144 A | 11/1993 | O'Callaghan | 429/14 |
| 5,312,699 A | 5/1994 | Yanagi et al. | 429/22 |
| 5,316,869 A | 5/1994 | Perry, Jr. et al. | 429/19 |
| 5,318,861 A | 6/1994 | Harats et al. | 429/21 |
| 5,346,778 A | 9/1994 | Ewan et al. | 429/19 |
| 5,348,820 A | 9/1994 | Suga et al. | 429/216 |
| 5,360,680 A | 11/1994 | Goldman et al. | 429/27 |
| 5,366,829 A | 11/1994 | Saidi | 429/216 |
| 5,369,353 A | 11/1994 | Erdman | 323/207 |
| 5,378,329 A | 1/1995 | Goldstein et al. | 205/602 |
| 5,382,482 A | 1/1995 | Suga et al. | 429/206 |
| 5,401,589 A | 3/1995 | Palmer et al. | 429/13 |
| 5,405,713 A | 4/1995 | Pecherer et al. | 429/49 |
| 5,411,815 A | 5/1995 | Goldstein | 429/50 |
| 5,427,872 A | 6/1995 | Shen et al. | 429/142 |
| 5,432,710 A | 7/1995 | Ishimaru et al. | 705/412 |
| 5,434,020 A | 7/1995 | Cooper | 429/210 |
| 5,434,021 A | 7/1995 | Fauteux et al. | 429/213 |
| 5,441,820 A | 8/1995 | Siu et al. | 429/17 |
| 5,462,815 A | 10/1995 | Horiuchi | 429/13 |
| 5,476,293 A | 12/1995 | Yang | 290/4 C |
| 5,488,300 A * | 1/1996 | Jamieson | 324/432 |
| 5,500,561 A | 3/1996 | Wilhelm | 307/64 |
| 5,547,778 A | 8/1996 | Fauteux et al. | 429/81 |
| 5,558,947 A | 9/1996 | Robison | 429/13 |
| 5,563,802 A | 10/1996 | Plahn et al. | 700/297 |
| 5,569,551 A | 10/1996 | Pedicini et al. | 429/27 |
| 5,578,183 A | 11/1996 | Cooper | 205/64 |
| 5,635,051 A | 6/1997 | Salas-Morales et al. | 205/602 |
| 5,637,414 A | 6/1997 | Inoue et al. | 429/13 |
| 5,701,078 A | 12/1997 | Lee et al. | 324/430 |
| 5,780,186 A | 7/1998 | Casey, Jr. | 429/229 |
| 5,783,932 A | 7/1998 | Namba et al. | 322/16 |
| 5,795,666 A | 8/1998 | Johnssen | 429/17 |
| 5,795,679 A | 8/1998 | Kawakami et al. | 429/218.1 |
| 5,824,434 A | 10/1998 | Kawakami et al. | 429/209 |
| 5,849,427 A | 12/1998 | Siu et al. | 429/19 |
| 5,869,200 A | 2/1999 | Nunnally | 429/10 |
| 5,880,536 A | 3/1999 | Mardirossian | 307/44 |
| 5,885,727 A | 3/1999 | Kawatsu | 429/17 |
| 5,929,538 A | 7/1999 | O'Sullivan et al. | 307/66 |
| 5,952,117 A | 9/1999 | Colborn et al. | 429/27 |
| 5,958,210 A | 9/1999 | Siu et al. | 205/602 |
| 5,961,928 A | 10/1999 | Maston et al. | 422/110 |
| 5,969,435 A | 10/1999 | Wilhelm | 307/64 |
| 5,984,986 A | 11/1999 | Wiesheu et al. | 48/203 |
| 5,985,474 A | 11/1999 | Chen et al. | 429/17 |
| 5,999,888 A | 12/1999 | Aubee | 702/45 |
| 6,051,192 A | 4/2000 | Maston et al. | 422/110 |
| 6,067,482 A | 5/2000 | Shapiro | 700/286 |
| 6,153,329 A | 11/2000 | Raschilla et al. | 429/65 |
| 6,162,555 A | 12/2000 | Gutierrez et al. | 429/15 |
| 6,186,254 B1 | 2/2001 | Mufford et al. | 180/65.3 |
| 6,230,496 B1 | 5/2001 | Hofmann et al. | 60/706 |
| 6,239,508 B1 | 5/2001 | Faris et al. | 307/9.1 |
| 6,242,873 B1 | 6/2001 | Drozdz et al. | 318/139 |
| 6,296,958 B1 | 10/2001 | Pinto et al. | 429/15 |
| 6,321,145 B1 | 11/2001 | Rajashekara | 701/22 |
| 6,326,763 B1 | 12/2001 | King et al. | 320/101 |
| 6,679,280 B1 * | 1/2004 | Pinto | 137/14 |
| 6,696,190 B2 * | 2/2004 | Haridoss | 429/22 |

OTHER PUBLICATIONS

Appleby, A.J. et al.: *Charge–Discharge Behavior of the C.G.E. Circulating Zinc–Air Vehicle Battery*; Society of Automotive Engineers, Cobo Hall, Detroit; Feb. 28–Mar. 4, 1977.

Cooper, J., et al.; *Demonstration of a Zinc/Air Fuel Battery to Enhance the Range and Mission of Fleet Electric Vehicles: Preliminary Results in the Refueling of a Multicell Module*; 29th Intersociety Energy Conversion Engineering Conference; Aug. 8, 1994; 8 pages.

Cooper, J.; *How the Zinc/Air Battery is Refueling the Competitiveness of Electric Vehicles*; Science & Technology Review; Oct. 1995; pp. 7–13.

* cited by examiner

METHOD OF AND SYSTEM FOR DETERMINING THE REMAINING ENERGY IN A METAL FUEL CELL

FIELD OF THE INVENTION

This invention relates generally to fuel cells, and, more specifically, to metal fuel cells, and measurements of remaining energy in metal fuel cells or electrochemical power systems employing the same.

RELATED ART

One technique for measuring the remaining energy of a metal fuel cell involves measuring the remaining amount of fuel that can be provided to the fuel cell from a source, such as a fuel tank or cartridge, coupled to the fuel cell. Unfortunately, however, this technique will not be accurate if the reaction medium in the fuel cell becomes saturated with reaction product before the remaining fuel can be consumed. In that case, a measurement of remaining energy derived from the remaining fuel will over-estimate the remaining energy in the fuel cell.

SUMMARY

One aspect of the invention comprises a method of measuring available energy in a metal fuel cell. The metal fuel cell utilized in accordance with this aspect has one or more reaction products of an electrochemical reaction occurring therein that are dissolved in a reaction medium to form a mixture having at least one electrical property. The method comprises measuring at least one of the electrical property(ies) of the mixture; and deriving an indication of the available energy of the fuel cell from the measured electrical property(ies). Suitable electrical property(ies) of the mixture that are measured in accordance with the invention include without limitation voltage potential, current, resistance, conductance, other electrical properties from which can be determined the concentration of one or more reaction products and/or the available energy in the fuel cell, and the like, and suitable combinations of any two or more thereof.

Another aspect of the invention comprises a system for measuring available energy in a metal fuel cell in which one or more reaction products of an electrochemical reaction occurring in the cell are dissolved in a reaction medium to form a mixture that has at least one suitable electrical property. The system comprises first componentry for measuring at least one of the electrical property(ies) of the mixture; and second componentry for deriving an indication of the available energy of the fuel cell from the measured electrical property(ies) of the mixture.

A further aspect of the invention comprises a metal fuel system comprising one or more metal fuel cells and a sub-system for measuring available energy in at least one of the fuel cells. The one or more metal fuel cells are capable of providing system power to a load. Moreover, one or more reaction products of an electrochemical reaction occurring in the one or more fuel cells is dissolved in a reaction medium to form a mixture having at least one suitable electrical property.

The sub-system comprises first isolation circuitry for deriving and substantially isolating a driving signal from system power, and first componentry for measuring at least one of the electrical property(ies) of the mixture responsive to the driving signal derived from system power, and outputting a first signal representative thereof. The sub-system further comprises second isolation circuitry for deriving and substantially isolating a second signal from the first signal, and second componentry for receiving the second signal, and, responsive thereto, deriving an indication of available energy in the one or more fuel cells.

An additional aspect of the invention comprises a system for producing a signal representative of a probe resistance. The system comprises a probe for applying a probe resistance between first and second probe terminals, and a bridge circuit which, responsive to an AC driving signal, switches between providing a signal at the first probe terminal which is representative of the probe resistance and providing a signal at the second probe terminal which is representative of the probe resistance. The system further comprises sampling circuitry for sampling either or both the signal provided at the first probe terminal and the signal provided at the second probe terminal, and outputting a signal representative of the one or more samples.

Another aspect of the invention comprises a method of producing a signal representative of a probe resistance. This method comprises applying a probe resistance between first and second probe terminals; and switching, responsive to an AC driving signal, between providing a signal at the first probe terminal which is representative of the probe resistance and providing a signal at the second probe terminal which is representative of the probe resistance. This method further comprises sampling either or both the signal provided at the first probe terminal and the signal provided at the second probe terminal to provide one or more samples; and outputting a signal representative of the one or more samples.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating some principles of the invention. In the figures, like reference numerals designate corresponding parts throughout the different views.

DETAILED DESCRIPTION

Introduction to Fuel Cells And Electrochemical Power Systems Employing Fuel Cells A metal fuel cell is a fuel cell that uses a metal, such as zinc particles, as fuel. In a metal fuel cell, the fuel is generally stored, transmitted and used in the presence of a reaction medium, such as potassium hydroxide solution.

Figure 1:
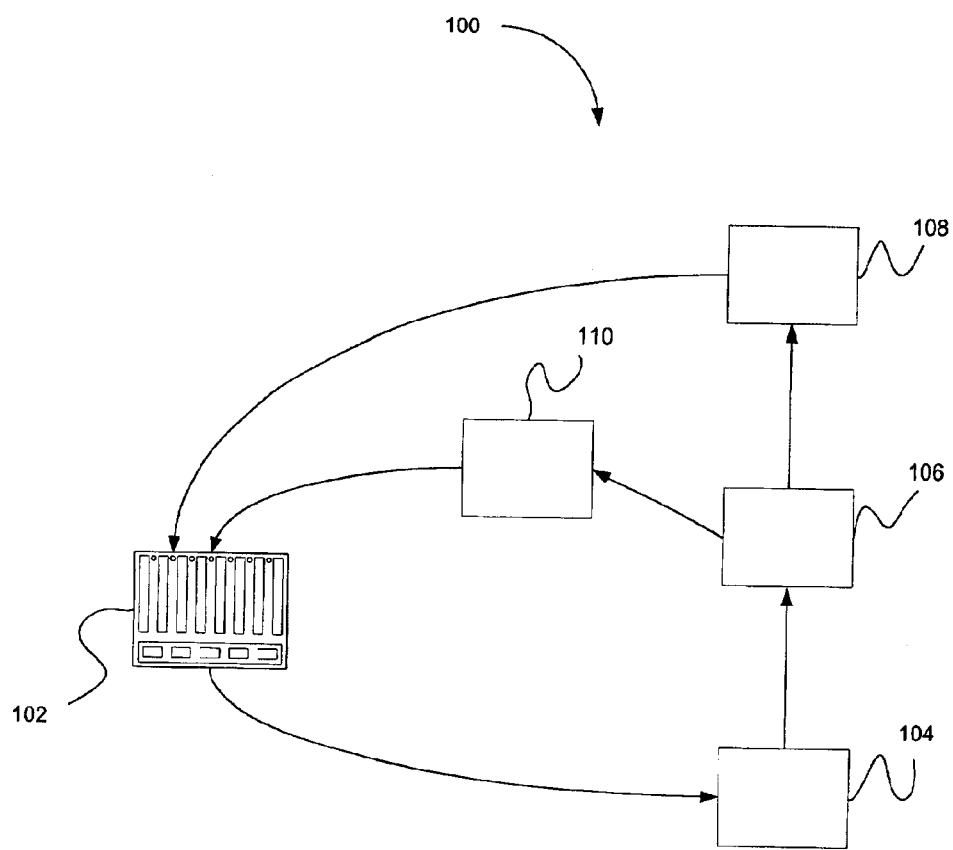
FIG. 1 is a simplified block diagram of an electrochemical power source system.

A block diagram of a fuel cell is illustrated in FIG. 1. As illustrated, the fuel cell comprises a power source 102, an optional reaction product storage unit 104, an optional regeneration unit 106, a fuel storage unit 108, and an optional second reactant storage unit 110. The power source 102 in turn comprises one or more cells each having a cell body defining a cell cavity, with an anode and cathode situated in each cell cavity. The cells can be coupled in parallel or series, or independently coupled to different electrical loads. In one implementation, they are coupled in series.

The anodes within the cell cavities in power source 102 comprise the fuel stored in fuel storage unit 108 or an electrode. Within the cell cavities of power source 102, an electrochemical reaction takes place whereby the anode releases electrons, and forms one or more reaction products. Through this process, the anodes are gradually consumed.

The electrons released from the electrochemical reaction at the anode flow through a load to the cathode, where they react with one or more second reactants from an optional second reactant storage unit 110 or from some other source. This flow of electrons through the load gives rise to an over-potential (i.e., work) required to drive the demanded current, which over-potential acts to decrease the theoretical voltage between the anode and the cathode. This theoretical voltage arises due to the difference in electrochemical potential between the anode (for example, in the case of a zinc fuel cell, Zn potential of −1.215V versus SHE (standard hydrogen electrode) reference at open circuit) and cathode ($O_2$ potential of +0.401V versus SHE reference at open circuit). When the cells are combined in series, the sum of the voltages for the cells forms the output of the power source.

The one or more reaction products can then be provided to optional reaction product storage unit 104 or to some other destination. The one or more reaction products, from unit 104 or some other source, can then be provided to optional regeneration unit 106, which regenerates fuel and/or one or more of the second reactants from the one or more reaction products. The regenerated fuel can then be provided to fuel storage unit 108, and/or the regenerated one or more second reactants can then be provided to optional second reactant storage unit 110 or to some other destination. As an alternative to regenerating the fuel from the reaction product using the optional regeneration unit 106, the fuel can be inserted into the system from an external source and the reaction product can be withdrawn from the system.

The optional reaction product storage unit 104 comprises a unit that can store the reaction product. Exemplary reaction product storage units include without limitation one or more tanks, one or more sponges, one or more containers, one or more vats, one or more canister, one or more chambers, one or more cylinders, one or more cavities, one or more barrels, one or more vessels, and the like, including without limitation those found in or which may be formed in a substrate, and suitable combinations of any two or more thereof. Optionally, the optional reaction product storage unit 104 is detachably attached to the system.

The optional regeneration unit 106 comprises a unit that can electrolyze the reaction product(s) back into fuel (e.g., electroactive particles, including without limitation metal particles and/or metal-coated particles, electroactive electrodes, and the like, and suitable combinations of any two or more thereof) and/or second reactant (e.g., air, oxygen, hydrogen peroxide, other oxidizing agents, and the like, and suitable combinations of any two or more thereof. Exemplary regeneration units include without limitation metal (e.g., zinc) electrolyzers (which regenerate a fuel (e.g., zinc) and a second reactant (e.g., oxygen) by electrolyzing a reaction product (e.g., zinc oxide (ZnO)), and the like. Exemplary metal electrolyzers include without limitation fluidized bed electrolyzers, spouted bed electrolyzers, and the like, and suitable combinations of two or more thereof The power source 102 can optionally function as the optional regeneration unit 106 by operating in reverse, thereby foregoing the need for a regeneration unit 106 separate from the power source 102. Optionally, the optional regeneration unit 106 is detachably attached to the system.

The fuel storage unit 108 comprises a unit that can store the fuel (e.g., for metal fuel cells, electroactive particles, including without limitation metal (or metal-coated) particles, liquid born metal (or metal-coated) particles, and the like; electroactive electrodes, and the like, and suitable combinations of any two or more thereof). Exemplary fuel storage units include without limitation one or more of any of the enumerated types of reaction product storage units, which in one embodiment are made of a substantially non-reactive material (e.g., stainless steel, plastic, or the like), for holding potassium hydroxide (KOH) and metal (e.g., zinc (Zn), other metals, and the like) particles, separately or together, and the like, and suitable combinations of any two or more thereof. Optionally, the fuel storage unit 108 is detachably attached to the system.

The optional second reactant storage unit 110 comprises a unit that can store the second reactant. Exemplary second reactant storage units include without limitation one or more tanks (for example, without limitation, a high-pressure tank for gaseous second reactant (e.g., oxygen gas), a cryogenic tank for liquid second reactant (e.g., liquid oxygen) which is a gas at operating temperature (e.g., room temperature), a tank for a second reactant which is a liquid or solid at operating temperature (e.g., room temperature), and the like), one or more of any of the enumerated types of reaction product storage units, which in one embodiment are made of a substantially non-reactive material, and the like, and suitable combinations of any two or more thereof. Optionally, the optional second reactant storage unit 110 is detachably attached to the system.

In one embodiment, the fuel cell is a metal fuel cell. The fuel of a metal fuel cell is a metal that can be in a form to facilitate entry into the cell cavities of the power source 102. For example, the fuel can be in the form of metal (or metal-coated) particles or liquid born metal (or metal-coated) particles or suitable combinations of any two or more thereof Exemplary metals for the metal (or metal-coated) particles include without limitation zinc, aluminum, lithium, magnesium, iron, sodium, and the like. Suitable alloys of such metals can also be utilized for the metal (or metal-coated) particles.

In this embodiment, when the fuel is optionally already present in the anode of the cell cavities in power source 102 prior to activating the fuel cell, the fuel cell is pre-charged, and can start-up significantly faster than when there is no fuel in the cell cavities and/or can run for a time in the range(s) from about 0.001 minutes to about 1000 minutes without additional fuel being moved into the cell cavities. The amount of time which the fuel cell can run on a pre-charge of fuel within the cell cavities can vary with, among other factors, the pressurization of the fuel within the cell cavities, and the power drawn from the fuel cell, and alternative embodiments of this aspect of the invention permit such amount of time to be in the range(s) from about 1 second to about 1000 minutes or more, and in the range(s) from about 30 seconds to about 1000 minutes or more.

Moreover, the second reactant optionally can be present in the fuel cell and pre-pressurized to any pressure in the range(s) from about 0 psi gauge pressure to about 200 psi gauge pressure. Furthermore, in this embodiment, one optional aspect provides that the volumes of one or both of the fuel storage unit 108 and the optional second reactant storage unit 110 can be independently changed as required to independently vary the energy of the system from its power, in view of the requirements of the system. Suitable such volumes can be calculated by utilizing, among other factors, the energy density of the system, the energy requirements of the one or more loads of the system, and the time requirements for the one or more loads of the system. In one embodiment, these volumes can vary in the range(s) from about $10^{-12}$ liters to about 1,000,000 liters. In another embodiment, the volumes can vary in the range(s) from about $10^{-12}$ liters to about 10 liters.

In one aspect of this embodiment, at least one of, and optionally all of, the metal fuel cell(s) is a zinc fuel cell in which the fuel is in the form of fluid borne zinc particles immersed in a potassium hydroxide (KOH) electrolytic reaction solution, and the anodes within the cell cavities are particulate anodes formed of the zinc particles. In this embodiment, the reaction products can be the zincate ion, $Zn(OH)_4^{2-}$, or zinc oxide, ZnO, and the one or more second reactants can be an oxidant (for example, oxygen (taken alone, or in any organic or aqueous (e.g., water-containing) fluid (for example and without limitation, liquid or gas (e.g., air)), hydrogen peroxide, and the like, and suitable combinations of any two or more thereof). When the second reactant is oxygen, the oxygen can be provided from the ambient air (in which case the optional second reactant storage unit 110 can be excluded), or from the second reactant storage unit 110. Similarly, when the second reactant is oxygen in water, the water can be provided from the second reactant storage unit 110, or from some other source, e.g., tap water (in which case the optional second reactant storage unit 110 can be excluded). In order to replenish the cathode, to deliver second reactant(s) to the cathodic area, and to facilitate ion exchange between the anodes and cathodes, a flow of the second reactant(s) can be maintained through a portion of the cells. This flow optionally can be maintained through one or more pumps (not shown in FIG. 1), blowers or the like, or through some other means. If the second reactant is air, it optionally can be pre-processed to remove $CO_2$ by, for example, passing the air through soda lime. This is generally known to improve performance of the fuel cell.

In this embodiment, the particulate fuel of the anodes is gradually consumed through electrochemical dissolution. In order to replenish the anodes, to deliver KOH to the anodes, and to facilitate ion exchange between the anodes and cathodes, a recirculating flow of the fluid borne zinc particles can be maintained through the cell cavities. This flow can be maintained through one or more pumps (not shown), convection, flow from a pressurized source, or through some other means.

As the potassium hydroxide contacts the zinc anodes, the following reaction takes place at the anodes:

$$Zn + 4OH^- \rightarrow Zn(OH)_4^{2-} + 2e^- \qquad (1)$$

The two released electrons flow through a load to the cathode where the following reaction takes place:

$$\frac{1}{2}O_2 + 2e^- + H_2O \rightarrow 2OH^- \qquad (2)$$

The reaction product is the zincate ion, $Zn(OH)_4^{2-}$, which is soluble in the reaction solution KOH. The overall reaction which occurs in the cell cavities is the combination of the two reactions (1) and (2). This combined reaction can be expressed as follows:

$$Zn + 2OH^- + \frac{1}{2}O_2 + H_2O \rightarrow Zn(OH)_4^{2-} \qquad (3)$$

Alternatively, the zincate ion, $Zn(OH)_4^{2-}$, can be allowed to precipitate to zinc oxide, ZnO, a second reaction product, in accordance with the following reaction:

$$ZN(OH)_4^{2-} \rightarrow ZnO + H_2O + 2OH^- \qquad (4)$$

In this case, the overall reaction which occurs in the cell cavities is the combination of the three reactions (1), (2), and (4). This overall reaction can be expressed as follows:

$$Zn + \frac{1}{2}O_2 \rightarrow ZnO \qquad (5)$$

Under real world conditions, the reactions (4) or (5) yield an open-circuit voltage potential of about 1.4V. For additional information on this embodiment of a zinc/air battery or fuel cell, the reader is referred to U.S. Pat. Nos. 5,952, 117; 6,153,329; and 6,162,555, which are hereby incorporated by reference herein as though set forth in full.

The reaction product $Zn(OH)_4^{2-}$, and also possibly ZnO, can be provided to reaction product storage unit 104. Optional regeneration unit 106 can then reprocess these reaction products to yield oxygen, which can be released to the ambient air or stored in second reactant storage unit 110, and zinc particles, which are provided to fuel storage unit 108. In addition, the optional regeneration unit 106 can yield water, which can be discharged through a drain or stored in second reactant storage unit 110 or fuel storage unit 108. It can also regenerate hydroxide, OH⁻, which can be discharged or combined with potassium ions to yield the potassium hydroxide reaction solution.

The regeneration of the zincate ion, $Zn(OH)_4^{2-}$, into zinc, and one or more second reactants can occur according to the following overall reaction:

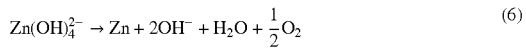

$$Zn(OH)_4^{2-} \rightarrow Zn + 2OH^- + H_2O + \frac{1}{2}O_2 \qquad (6)$$

The regeneration of zinc oxide, ZnO, into zinc, and one or more second reactants can occur according to the following overall reaction:

$$ZnO \rightarrow Zn + \frac{1}{2}O_2 \qquad (7)$$

It should be appreciated that embodiments of metal fuel cells other than zinc fuel cells or the particular form of zinc fuel cell described above are possible for use in a system according to the invention. For example, aluminum fuel cells, lithium fuel cells, magnesium fuel cells, iron fuel cells, sodium fuel cells, and the like are possible, as are metal fuel cells where the fuel is not in particulate form but in another form such as without limitation sheets, ribbons, strings, slabs, plates, or the like, or suitable combinations of any two or more thereof Embodiments are also possible in which the fuel is not fluid borne or continuously re-circulated through the cell cavities (e.g., porous plates of fuel, ribbons of fuel being cycled past a reaction zone, and the like). It is also possible to avoid an electrolytic reaction solution altogether or at least employ reaction solutions comprising elements other than potassium hydroxide, for example, without limitation, reaction solutions comprising sodium hydroxide, inorganic alkalis, alkali or alkaline earth metal hydroxides or aqueous salts such as sodium chloride, or the like, or suitable combinations of any two or more thereof. See, for example, U.S. Pat. No. 5,958,210, the entire contents of which are incorporated herein by this reference. It is also possible to employ metal fuel cells that output AC power rather than DC power using an inverter, a voltage converter, or the like, or suitable combinations of any two or more thereof In a second embodiment of a fuel cell useful in the practice of the invention system, a metal fuel cell system is provided. Such system is characterized in that it has one, or any suitable combination of two or more, of the following properties: the system optionally can be configured to not utilize or produce significant quantities of flammable fuel or product, respectively; the system can provide primary and/or auxiliary/backup power to the one or more loads for an amount of time limited only by the amount of fuel present (e.g., in the range(s) from about 0.01 hours to about 10,000 hours or more, and in the range(s) from about 0.5 hours to about 650 hours, or more); the system optionally can be configured to have an energy density in the range(s) from about 35 Watt-hours per kilogram of combined fuel and electrolyte (reaction medium) added to about 400 Watt-hours per kilogram of combined fuel and electrolyte added; the system optionally can further comprise an energy requirement and can be configured such that the combined volume of fuel and electrolyte added to the system is in the range(s) from about 0.0028 L per Watt-hour of the system's energy requirement to about 0.025 L per Watt-hour of the system's energy requirement, and this energy requirement can be calculated in view of, among other factors, the energy requirement(s) of the one or more load(s) comprising the system (In one embodiment, the energy requirement of the system can be in the range(s) from 50 Watt-hours to about 500,000 Watt-hours, whereas in another embodiment, the energy requirement of the system can be in the range(s) from 5 Watt-hours to about 50,000,000 Watt-hours; in yet another embodiment, the energy requirement can range from $5 \times 10^{-12}$ Watt-hours to 50,000 Watt-hours); the system optionally can be configured to have a fuel storage unit that can store fuel at an internal pressure in the range(s) from about −5 pounds per square inch (psi) gauge pressure to about 200 psi gauge pressure; the system optionally can be configured to operate normally while generating noise in the range(s) from about 1 dB to about 50 dB (when measured at a distance of about 10 meters therefrom), and alternatively in the range(s) of less than about 50 dB (when measured at distance of about 10 meters therefrom). In one implementation, this metal fuel cell system comprises a zinc fuel cell system.

Figure 2:
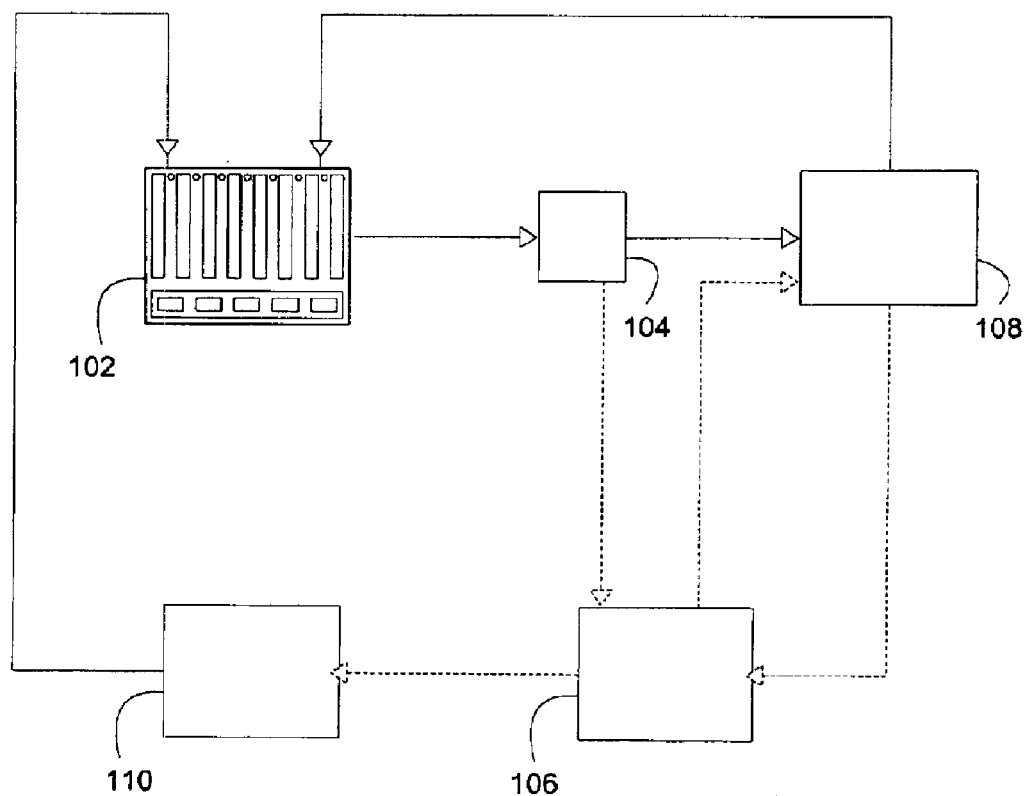
FIG. 2 is a simplified block diagram of an alternate embodiment of an electrochemical power source system.

FIG. 2 is a block diagram of an alternative embodiment of a metal-based fuel cell in which, compared to FIG. 1, like elements are referenced with like identifying numerals. Dashed lines are flow paths for the recirculating reaction solution when the optional regeneration unit is present and running. Solid lines are flow paths for the recirculating anode fluid when the fuel cell system is running in idle or discharge mode. As illustrated, in this embodiment, when the system is operating in the discharge mode, optional regeneration unit 106 need not be in the flow path represented by the solid lines.

An advantage of fuel cells relative to traditional power sources such as lead acid batteries is that they can provide longer term primary and/or auxiliary/backup power more efficiently and compactly. This advantage stems from the ability to continuously refuel the fuel cells using fuel stored with the fuel cell, from some other source, and/or regenerated from reaction products by the optional regeneration unit 106. In the case of the metal (e.g., zinc) fuel cell, for example, the duration of time over which energy can be provided is limited only by the amount of fuel and reaction medium (if used) which is initially provided in the fuel storage unit, which is fed into the system during replacement of a fuel storage unit 108 and/or which can be regenerated from the reaction products that are produced. Thus, the system, comprising at least one fuel cell that comprises an optional regeneration unit 106 and/or a replaceable fuel storage unit 108 can provide primary and/or auxiliary/backup power to the one or more loads for a time in the range(s) from about 0.01 hours to about 10000 hours, or even more. In one aspect of this embodiment, the system can provide back-up power to the one or more loads for a time in the range(s) from about 0.5 hours to about 650 hours, or even more.

Moreover, the system can optionally can be configured to expel substantially no reaction product(s) outside of the system (e.g., into the environment).

Embodiments of the Invention

As utilized herein, the term "electrode" is a conductor at the surface of, or within, which a change occurs from conduction by electrons to conduction by ions or colloidal ions; the term "cathode" is an electrode at which positive ions are discharged, or negative ions are formed, or at which other reducing reactions occur; and the term "anode" is an electrode at which negative ions are discharged, or positive ions are formed, or at which other oxidizing reactions occur.

In one implementation, the electrode can comprise conductive and non-conductive regions whereby the characteristics of such regions include without limitation hydrophilic and hydrophobic domains, as applicable.

As utilized herein, terms such as "approximately," "about" and "substantially" are intended to allow some leeway in mathematical exactness to account for tolerances that are acceptable in the trade, e.g., any deviation upward or downward from the value modified by "approximately," "about" or "substantially" by any value in the range(s) from 1% to 20% of such value.

As employed herein, the terms or phrases "in the range(s)" or "between" comprises the range defined by the values listed after the term "in the range(s)" or "between", as well as any and all subranges contained within such range, where each such subrange is defined as having as a first endpoint any value in such range, and as a second endpoint any value in such range that is greater than the first endpoint and that is in such range.

As utilized herein, the term "logic" comprises hardware, software, and combinations of hardware and software, and the term "componentry" comprises "logic" possibly in combination with one or more electromechanical devices or apparatus, such as probes or the like.

As utilized herein, the terms "measure" and grammatical variants thereof with respect to particular property(ies) comprise, as applicable, measuring such particular property(ies) (e.g., voltage potential (V), current (i), and the like, and suitable combinations of any two or more thereof), and/or calculating or determining additional property(ies) that are readily calculable or determinable from the value of such particular property(ies) (e.g., resistance (R), conductance ($R^{-1}$), conductivity (C/R, where C is the cell constant), resistivity ($(C/R)^{-1}$), and the like, and suitable combinations of any two or more thereof).

Figure 3A:
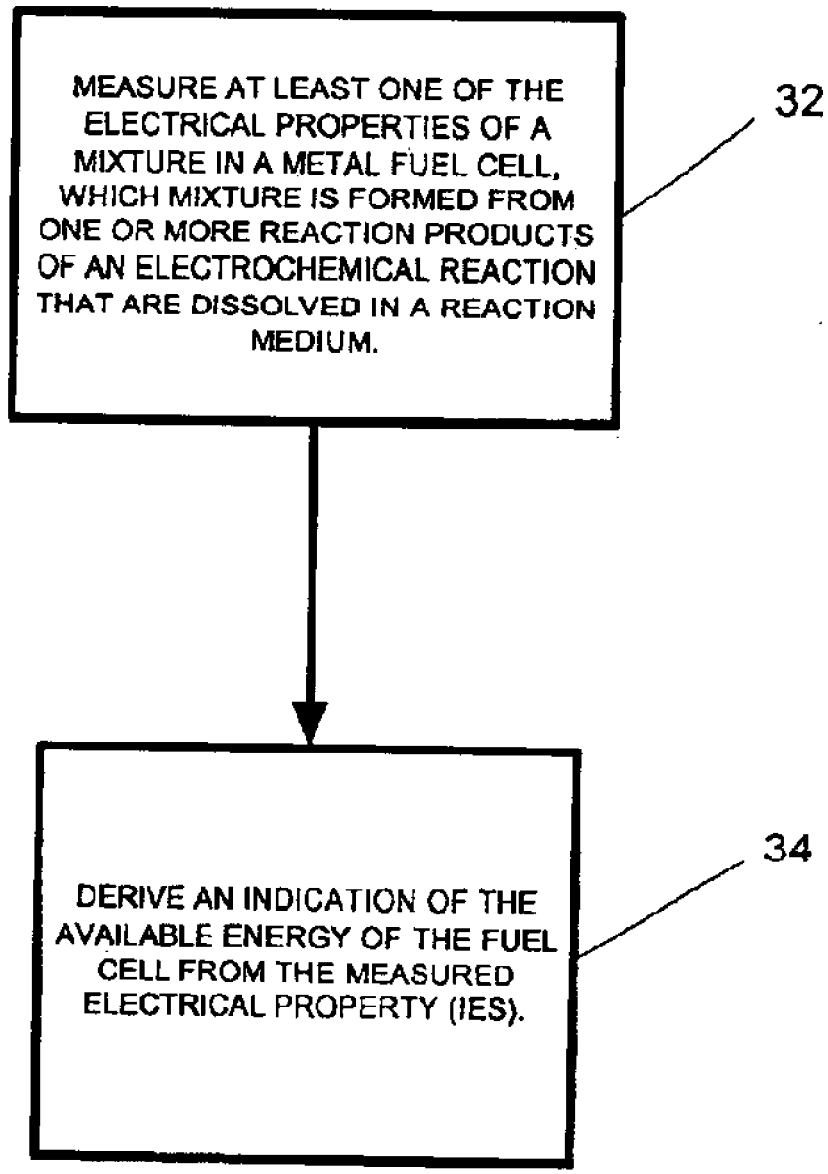
FIG. 3A is a flowchart illustrating one embodiment of a method for measuring available energy in a metal fuel cell according to the invention.

Referring to FIG. 3A, a flowchart of one embodiment of a method of measuring available energy in a metal fuel cell is illustrated. The metal fuel cell utilized in accordance with this embodiment comprises one or more reaction products of an electrochemical reaction occurring therein that are dissolved in a reaction medium to form a mixture having at least one electrical property. In one embodiment, the fuel cell comprises a zinc fuel cell; and, alternatively or additionally, the reaction medium comprises potassium hydroxide; and, alternatively or additionally, the reaction product comprises the zincate ion, $Zn(OH)_4^{2-}$.

In step 32, the method comprises measuring at least one of the electrical property(ies) of the mixture. Suitable electrical property(ies) of the mixture that are measured in accordance with the invention include without limitation voltage potential, current, resistance, conductance, other electrical properties from which can be determined the concentration of one or more reaction products and/or the available energy in the fuel cell, and the like, and suitable combinations of any two or more thereof.

In one embodiment, the at least one of the electrical property(ies) comprise resistance. In one application, this step comprises measuring the resistance of the mixture with a probe. The step of measuring the resistance of the mixture with a probe can comprise immersing the probe in the reaction medium to measure the probe resistance.

From step 32, the method proceeds to step 34. In step 34, the method comprises deriving an indication of the available energy of the fuel cell from the measured electrical property(ies). In one embodiment, this step comprises estimating the concentration of the reaction product in the reaction solution from the measured resistance, and deriving the available energy of the fuel cell from the estimated concentration. In another embodiment, this step comprises determining the conductivity of the reaction product in the reaction solution from the measured resistance, estimating the concentration of the reaction product in the reaction solution from the conductivity as determined from the measured resistance, and deriving the available energy of the fuel cell from the estimated concentration.

Figure 3B:
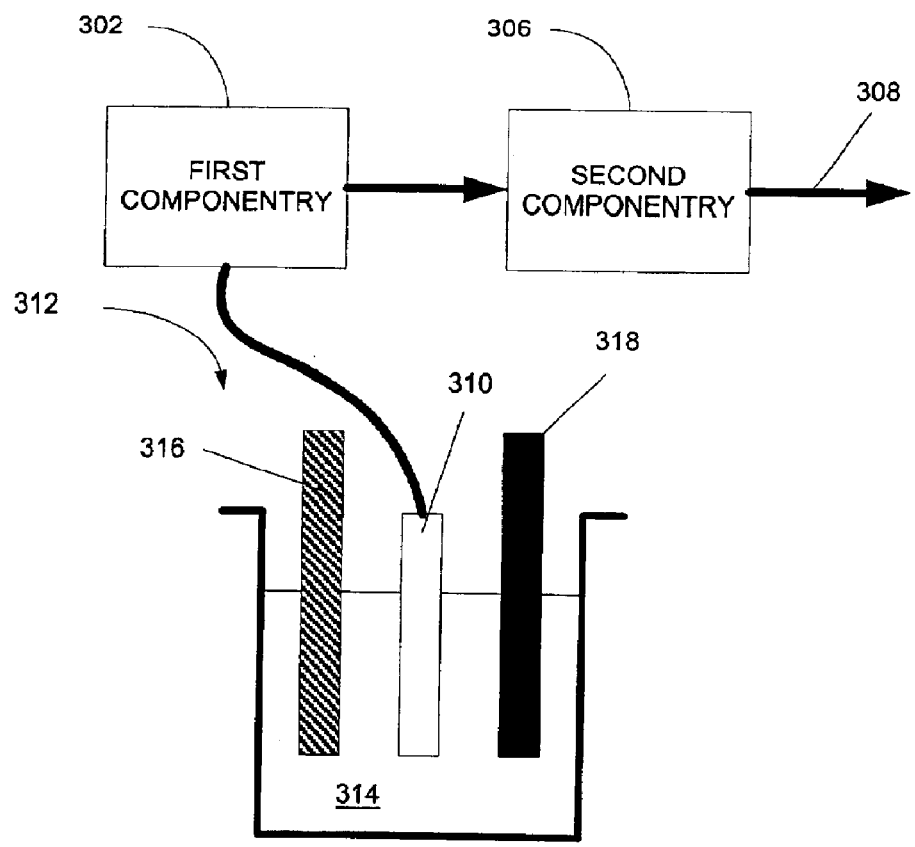
FIG. 3B is a simplified block diagram of an embodiment of a system according to the invention for determining the available energy in a metal fuel cell from a measurement of at least one electrical property of a mixture formed from one or more reaction products dissolved in a reaction medium.

Referring to FIG. 3B, one embodiment of the invention is illustrated. This embodiment comprises a system for measuring available energy in a metal fuel cell 312 in which one or more reaction products of an electrochemical reaction occurring in the cell are dissolved in a reaction medium to form a mixture 314 that has at least one electrical property. (The cathode and anode of the fuel cell are respectively identified with numerals 316 and 318). The system comprises first componentry 302 for measuring at least one of the electrical property(ies) of the mixture; and second componentry 306 for deriving an indication 308 of the available energy of the fuel cell from the measured electrical property(ies) of the mixture.

Suitable electrical property(ies) of the mixture 314 include without limitation voltage potential, current, resistance, conductance, other electrical properties from which can be determined the concentration of one or more reaction products and/or the available energy in the fuel cell, and the like, and suitable combinations of any two or more thereof Moreover, the indication 308 of the available energy can be in any machine or human perceptible form, such as a signal, a human perceivable meter reading, a logic perceivable meter reading, or the like, or suitable combinations of any two or more thereof. The first and second componentry 302, 306 can be powered by system power derived from the cathode 316 and anode 318 of the fuel cell, or through some other means.

The electrical property(ies) of the mixture can be obtained or measured through a probe 310 coupled to the first componentry and at least partly immersed in the mixture, or through some other means.

The electrical property(ies) measured can be one, such as without limitation voltage potential, current, resistance or conductance or the like or suitable combinations of any two or more thereof, which bears a known relationship to the concentration of reaction product dissolved in the medium. Using this known relationship, the second componentry 306 derives the concentration of the reaction product dissolved in the reaction medium.

In one embodiment, for a fixed amount of reaction medium, the amount of reaction product that can be dissolved in the medium places a limit on the available energy from the fuel cell. The difference between this limit concentration and the actual concentration thus bears a relationship to the remaining energy in the fuel cell. Using this limit concentration and the known relationship, in the one embodiment, the second componentry 306 derives an indication of the available energy in the fuel cell from the derived concentration of the reaction product in the reaction medium.

For example, consider a zinc fuel cell, the anodic reaction of which consumes zinc and potassium hydroxide, and produces a soluble potassium zincate species. For a fixed amount of potassium hydroxide electrolyte, the amount of zinc that can be dissolved electrochemically is therefore limited by the solubility of the zincate species. The difference between this limit value, $c_1$, and the actual concentration, c, is therefore a measure of the mass of zinc, $m_z$ that can be electrochemically dissolved. The remaining energy, $E_r$ that the zinc fuel cell can produce is directly determined by the mass of zinc that can be electrochemically dissolved as follows:

$$E_r=(c_1-c)*2*F*V_{KOH}*V \quad (8)$$

where $V_{KOH}$ is the volume of the KOH electrolyte in the system, V is the operating voltage of the fuel cell, and F is Faraday's constant (e.g., 96486.70 Coulomb/mole). Now $c_1$, $V_{KOH}$, V are known and fixed quantities; therefore, if c can be measured, then $E_r$ can be calculated.

The remaining energy can be expressed as a fraction or percent $E_F$ of the energy available at the beginning of the discharge as follows:

$$E_F=(c_1-c)/(c_1-c_i) \quad (9)$$

where $c_i$ is the concentration of potassium zincate at the beginning of the discharge cycle.

This principle can be used to calculate the remaining energy, which is a measure of the remaining fuel, with a conductametric method for measuring the concentration of dissolved zincate, which method will now be explained.

The ionic conductivity of an electrolyte is a function of the concentration and electrical mobility of the ionic species, both of which are temperature dependent, and electrical charge of the ionic species. At any given temperature, the ionic conductivity of potassium hydroxide electrolyte decreases with increasing concentration of potassium zincate. Thus, providing the temperature is known, the conductivity of the electrolyte can provide a direct measure of the concentration of dissolved zincate.

The conductivity of the electrolyte can be calculated from the measured resistance of the electrolyte, providing the cell constant is known. Typically, the value of the cell constant for a particular cell is a function of the electrode areas of the cathode and anode of such cell, and of the separation distance between the cathode and the anode. Thus, in one example of a calculation of the cell constant of a simple cell, where the respective surfaces of the cathode and anode of the simple cell are equal in area, A, are parallel to each other, and are separated by a distance, d, and where the simple cell's volume between the cathode and the anode is suitably bounded by a suitable surface, the cell constant for such simple cell is the area divided by the distance (A/d).

The resistance can be measured by an implementation of the first componentry 302, which provides an output signal proportional to the resistance. If the temperature is also measured, then, from the known functional dependence of conductivity on temperature and concentration, the second componentry 306 can calculate the zincate concentration.

At the beginning of the discharge cycle, the system can measure $c_i$, and as time proceeds, also measure c. From these values, the system can calculate $E_F$ in accordance with equation (9) above. This value may then be displayed as a measure of the remaining energy.

Figure 4:
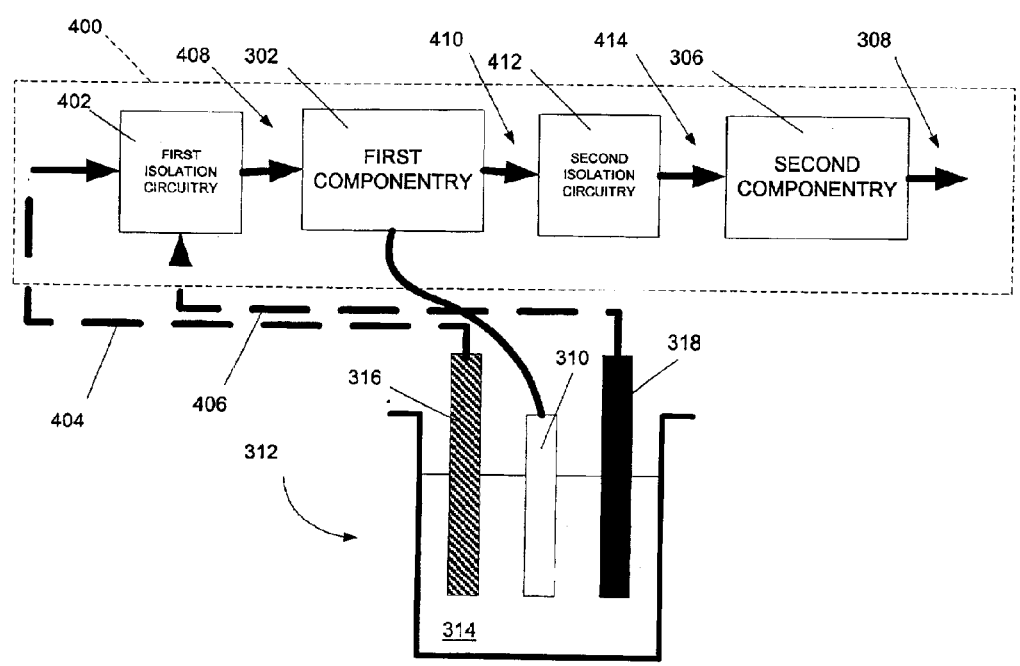
FIG. 4 is a simplified block diagram of an embodiment of a system according to the invention for determining the available energy in a metal fuel cell in which a measurement of at least one electrical property of a mixture formed from one or more reaction products dissolved in a reaction medium is obtained in a manner which achieves substantial isolation from system power.

Referring to FIG. 4, another embodiment of the invention comprises a metal fuel system that in turn comprises one or more metal fuel cells 312 and a sub-system 400 for measuring available energy in at least one of the fuel cells 312. The one or more metal fuel cells are capable of providing system power to a load from leads 404 and 406 coupled respectively to the cathode 316 and anode 318 thereof. Moreover, as with the previous embodiment, one or more reaction products of an electrochemical reaction occurring in the one or more cells is dissolved in a reaction medium to form a mixture 314 having at least one suitable electrical property.

The sub-system 400 comprises first isolation circuitry 402,which is powered by system power provided to first isolation circuitry 402 through lead 404, which is coupled, to the cathode 316 of the fuel cell. In addition, the first isolation circuitry 402 is grounded to system ground through lead 406 coupled to anode 318 of the fuel cell.

The first isolation circuitry 402 derives and isolates a driving signal from system power, and outputs the same on one or more signal lines 408. In one implementation, system power comprises a DC signal, and the driving signal output on one or more signal lines 408 is a DC driving signal.

The sub-system 400 further comprises first componentry 302 for measuring at least one of the suitable electrical property(ies) of the mixture 314 responsive to the driving signal derived from system power, and outputting a first signal representative thereof on one or more signal lines 410. In one implementation, the first componentry 302 measures the resistance of the mixture 314 through a probe 310 immersed at least in part in the mixture 314.

The sub-system 400 further comprises second isolation circuitry 412 for deriving and substantially isolating a second signal from the first signal, and outputting the same on one or more signal lines 414, and second componentry 306 for receiving the second signal on one or more signal lines 414, and, responsive thereto, deriving an indication 308 of available energy in the one or more fuel cells.

In one implementation, system power is a DC voltage signal, first isolation circuitry 402 is a DC-DC converter which outputs on one or more signal lines 408 a DC driving signal responsive to system power, and first componentry 302 outputs on one or more signal lines 410 a voltage signal representative of the resistance of the mixture 314 responsive to the DV driving signal. In this implementation, second isolation circuitry 412 is a voltage-frequency-voltage converter which receives the voltage signal output on one or more signal lines 414, modulates the frequency of a light signal responsive thereto to form a modulated light signal, and then converts the modulated light signal back into a second voltage signal which is output on one or more signal lines 414. Responsive to this second voltage signal, second componentry 306 derives an indication of available energy in the one or more fuel cells, and outputs the same on one or more signal lines 308.

In this embodiment, it can be seen that the mechanism for measuring the electrical property of the mixture 314 is isolated from system power and ground to, among other factors, avoid undue interference with the measurements which could otherwise occur from noise and the like, and avoid disruptive processes which could otherwise occur, such as electroplating of metal on probe 310.

Figure 5:
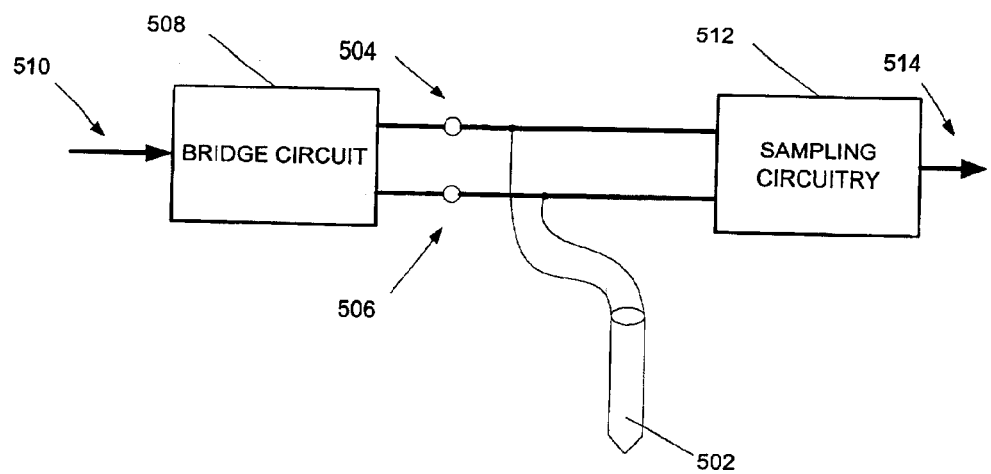
FIG. 5 illustrates a simplified block diagram of a circuit for measuring probe resistance according to the invention.

A further embodiment of the invention comprises a system for producing a signal representative of a probe resistance. In one application, the system may serve as the first componentry 302 in any of the previous embodiments. Referring to FIG. 5, the system comprises a probe 502 for applying a probe resistance between first and second probe terminals 504 and 506 respectively, and a bridge circuit 508 which, responsive to an AC driving signal 510, switches between providing a signal at the first probe terminal 504 which is representative of the probe resistance and providing a signal at the second probe terminal 506 which is representative of the probe resistance. The system further comprises sampling circuitry 512 for sampling either or both the signal provided at the first probe terminal 504 and the signal provided at the second probe terminal 506, and outputting a signal 514 representative of the one or more samples. In one embodiment of the invention, the bridge circuit 508 can be half-bridge circuit or a full-bridge circuit.

In one implementation of this embodiment, the bridge circuit 508 switches polarity of the signal applied to the first and second probe terminals 504 and 506 in order to avoid electroplating of the probe with metal which could otherwise occur. In this implementation, this switching occurs at the frequency of the AC driving signal which is typically greater than the minimum frequency required to avoid capacitance effects created on immersing the probe in the mixture. In one example, the frequency of the AC driving signal varies in the range(s) greater than about 80 to about 120 kHz, and in another example, this frequency is greater than about 100 kHz or more. In one implementation, this frequency is about 100 KHz.

Figure 6B:
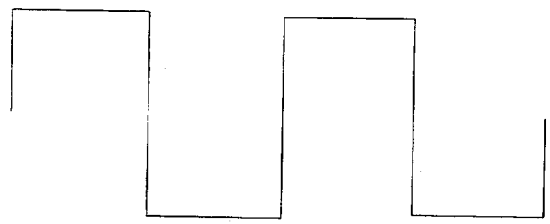
FIGS. 6B–6C illustrate example segments of an AC driving signal.
Figure 6C:
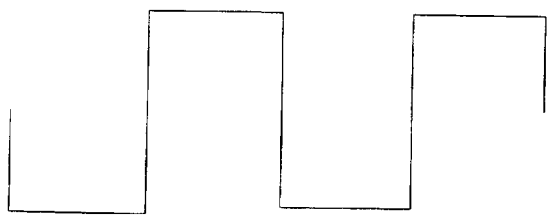
Figure 6A:
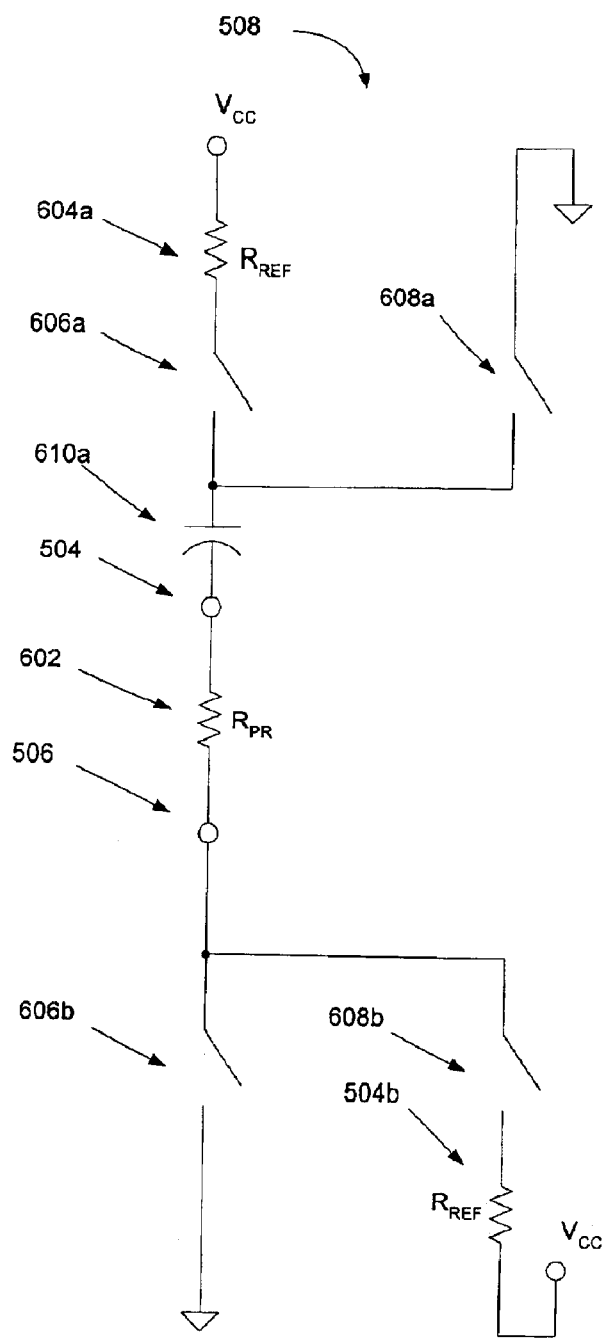
FIG. 6A illustrates a diagram of an embodiment of a bridge circuit for use in a system according to the invention.

Referring to FIG. 6A, an implementation example of bridge circuit 508 is illustrated. First and second probe terminals are identified respectively with numerals 504 and 506. Coupled between the probe terminals is a probe resistance $R_{PR}$, identified with numeral 602, which is not in actuality a discrete component, but instead is application-dependent and represents the parameter to be measured by the circuit. In the application described previously, it represents the resistance of the mixture of reaction medium and dissolved reaction product(s) of a fuel cell.

Capacitor 610a is a DC blocking capacitor which is included to block the flow of any DC current to the probe terminals 504 and 506 from the remaining portions of the circuit. This current is blocked to avoid electroplating of the probe, which could otherwise occur in the application described previously, where the probe is at least partly immersed in a mixture of a reaction medium and one or more reaction products for the purpose of measuring the resistance of the mixture. In other applications where electroplating would not present a problem, DC blocking capacitor(s) could be avoided.

Switches 606a and 606b are coupled to an AC driving signal, such as illustrated in FIG. 6B, and are configured to close when the AC driving signal is asserted, and remain open otherwise. Switches 608a and 608b, on the other hand, are coupled to the inverse of the AC driving signal, such as illustrated in FIG. 6C, and are configured to close when the AC driving signal is unasserted, and remain open otherwise. The switches 606a, 606b, 608a, 608b may each be implemented in a variety of forms, including but not limited to bipolar, MOS, or CMOS transistors, either NPN or PNP (in the case of bipolar) or n-type or p-type (in the case of MOS or CMOS).

The AC driving signal may be asserted in the high state or the low state. If the signal is asserted in the high state, the switches 606a and 606b will be closed, and switches 608a and 608b will be open, during the time periods when the AC driving signal is high. Similarly, the switches 606a and 606b will be open, and switches 608a and 608b will be closed, during the time periods when the AC driving signal is low. If the AC driving signal is asserted low, the exact opposite is the case.

Figure 7:
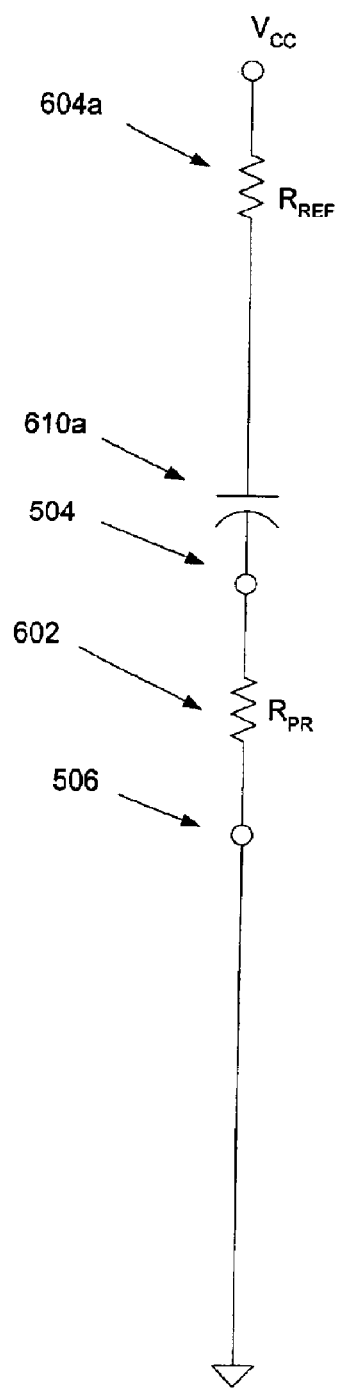
FIG. 7 illustrates an equivalent of the bridge circuit of FIG. 6 during a first portion of the period of the AC driving signal.

Whichever mode is in effect, during the time periods when the AC driving signal is asserted, the bridge circuit 508 may be represented by the voltage divider circuit of FIG. 7. Ignoring for the moment the effect of the blocking capacitor 610a (a safe assumption if the frequency of switching is fast enough), the voltage at the first probe terminal 504 is given by the following expression:

$$V_P = \frac{R_{PR}}{R_{PR} + R_{REF}} \times V_{CC} \quad (10)$$

The voltage at the second probe terminal 506 is tied to ground.

Figure 8:
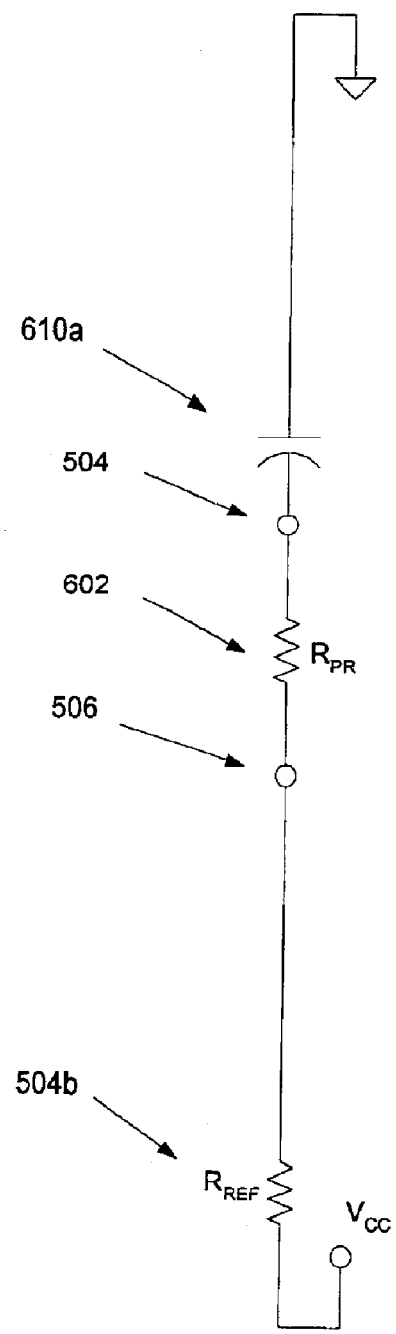
FIG. 8 illustrates an equivalent of the bridge circuit of FIG. 6 during a second portion of the period of the AC driving signal.

During the time periods when the AC driving signal is unasserted, the bridge circuit 508 may be represented by the voltage divider circuit of FIG. 8. Again ignoring for the moment the effect of the blocking capacitor 610a, the voltage at the second probe terminal 506 is also given by the expression (10) above, while the voltage at the first probe terminal 504 is tied to ground.

Thus, it can be seen that the voltage at the first probe terminal 504 will alternate between $V_P$ and 0 volts at the frequency of the AC driving signal. Similarly, the voltage at the second probe terminal 506 will also alternate between $V_P$ and 0 volts at the frequency of the AC driving signal, but will be exactly 180° out of phase with the voltage signal at the first probe terminal 504.

Referring back to FIG. 5, in one embodiment, the sampling circuitry 512 is configured to sample the signal provided on the first probe terminal 504 during the time periods that the AC driving signal is asserted, or the signal provided on the second probe terminal 506 during the time periods that the AC driving signal is unasserted, or both, thereby obtaining one or more samples representative of $V_P$ and therefore $R_{PR}$. However, it should be appreciated that embodiments are possible where the sampling circuitry 512 is configured to sample the signal provided on the first probe terminal 504 during the time periods that the AC driving signal is unasserted, or sample the signal provided on the second probe terminal 506 during the time periods when the AC driving signal is asserted. Therefore, nothing in the other embodiment should be taken as limiting. Sampling circuitry 512 then derives a signal representative of the one or more samples, and outputs the same on one or more signal lines 514.

Figure 9:
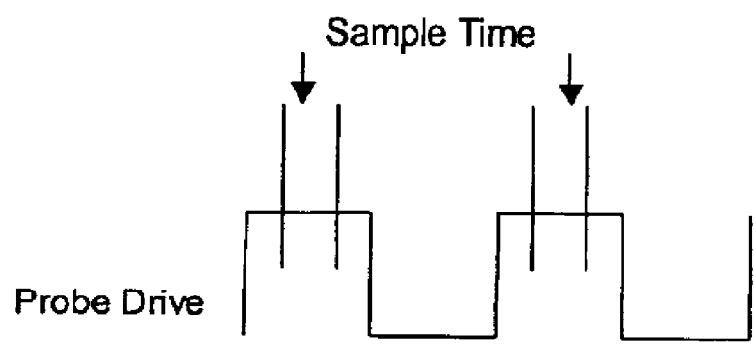
FIG. 9 illustrates an example of the sampling time in relation to the pulses of the AC driving signal in one embodiment of a system according to the invention.

In one implementation, referring to FIG. 9, the sampling circuitry 512 is configured to sample the voltage provided at the first probe terminal 504 during the positive going pulses of the AC driving signal. (It should be appreciated that sampling circuitry 512 may be configured to sample the voltage provided at the first probe terminal 504 during the negative going pulses of the AC driving signal, so nothing in this implementation should be taken as limiting). In one particular embodiment, the time periods over which the sampling occurs in this implementation can be approximately centered on the positive going pulses, and can be deferred relative to the rising edges of the positive going pulses, and advanced relative to the falling edges of the positive going pulses. In another particular embodiment, the time periods over which the sampling occurs in this implementation can vary such that the sampling occurs on the positive going pulses in the range(s) from about the rising edges of the positive going pulses to about the falling edges of the positive going pulses, so long as the samplings are deferred relative to the rising edges of the positive going pulses, and advanced relative to the falling edges of the positive going pulses.

In one example, the time periods over which the sampling occurs are sufficiently deferred relative to the rising edges of the positive going pulses, and sufficiently advanced relative to the rising edges of the positive going pulses in order to avoid the influence of capacitive and inductive effects, which occur at the rising and falling edges, on the measurements. In one embodiment, acceptable levels of capacitive or inductive effects on the probe measurements are such that the actual probe measurements are approximately the same as probe measurements that are taken if the time periods over which the sampling occurs are approximately centered on the positive going pulses, and are deferred relative to the falling edges of the positive going pulses, and advanced relative to the rising edges of the positive going pulses.

Alternatively or in addition, the sampling circuitry 512 may be configured to sample the voltage provided at the second probe terminal 506 during the negative going pulses of the AC driving signal. (It should be appreciated that sampling circuitry 512 may be configured to sample the voltage provided at the second probe terminal 506 during the positive going pulses of the AC driving signal, so nothing in this implementation should be taken as limiting). In one particular embodiment, the time periods over which the sampling occurs in this implementation are approximately centered on the negative going pulses, and are deferred relative to the falling edges of the negative going pulses, and advanced relative to the rising edges of the negative going pulses. In another particular embodiment, the time periods over which the sampling occurs in this implementation can vary such that the sampling occurs on the positive going pulses in the range(s) from about the rising edges of the negative going pulses to about the falling edges of the negative going pulses, so long as the samplings are deferred relative to the rising edges of the negative going pulses, and advanced relative to the falling edges of the negative going pulses.

In one example, the time periods over which the sampling occurs are sufficiently deferred relative to the falling edges of the negative going pulses, and sufficiently advanced relative to the rising edges of the negative going pulses in order to avoid the influence of capacitive and inductive effects, which occur at the rising and falling edges, on the measurements. In one embodiment, acceptable levels of capacitive or inductive effects on the probe measurements are such that the actual probe measurements are approximately the same as probe measurements that are taken if the time periods over which the sampling occurs are approximately centered on the negative going pulses, and are deferred related to the falling edges of the negative going pulses, and advanced related to the rising edges of the negative going pulses.

Figure 10:
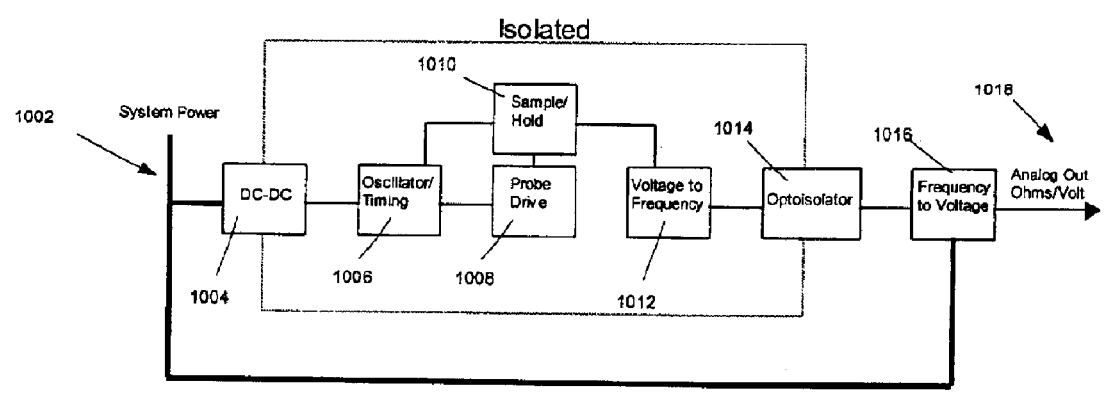
FIG. 10 is a block diagram of one embodiment of a circuit according to the invention for measuring probe resistance.

Referring to FIG. 10, a blocking diagram of an implementation example of a circuit for measuring probe resistance is illustrated. As illustrated, system power 1002 is input to DC-DC converter 1004, which outputs a DC driving signal which is substantially isolated from system power and ground. The DC driving signal is input to oscillator/timing circuitry 1006 which produces an AC driving signal responsive to the DC driving signal. The AC driving signal is input to bridge circuitry 1008, which outputs on alternating voltage signal representative of the probe resistance onto first and second probe terminals. Oscillator/timing circuitry 1006 also produces one or more timing signals which control the time period during which sample/hold circuitry 1010 samples the voltage signal on one or both of the probe terminals.

The sample/hold circuitry 1010 obtains one or more samples of the voltage provided at one or both of the probe terminals, and outputs a voltage signal representative thereof. The signal is input to voltage-to-frequency converter 1012, which modulates the frequency of a digital signal responsive to the voltage signal output by sample/hold circuitry 1010.

The modulated digital signal is input to optoisolator 1014. The output of optoisolator 1014 is input to frequency-to-voltage converter 1016, which converts the modulated digital signal into a voltage signal. The voltage signal is then output over one or more signal lines 1018.

Note that the frequency-to-voltage converter 1016 is powered by system power, while all the other modules are, with the exception of DC-DC converter 1004, substantially isolated from system power and ground.

Figure 11:
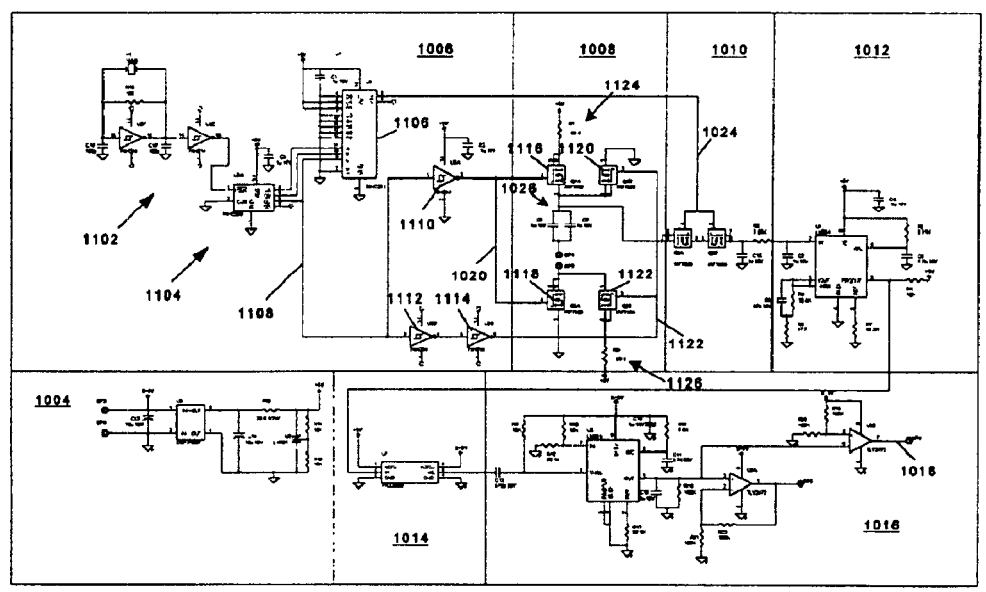
FIGS. 11A–11B are diagrams of one implementation of a circuit according to the invention for measuring probe resistance.
Figure 11A:
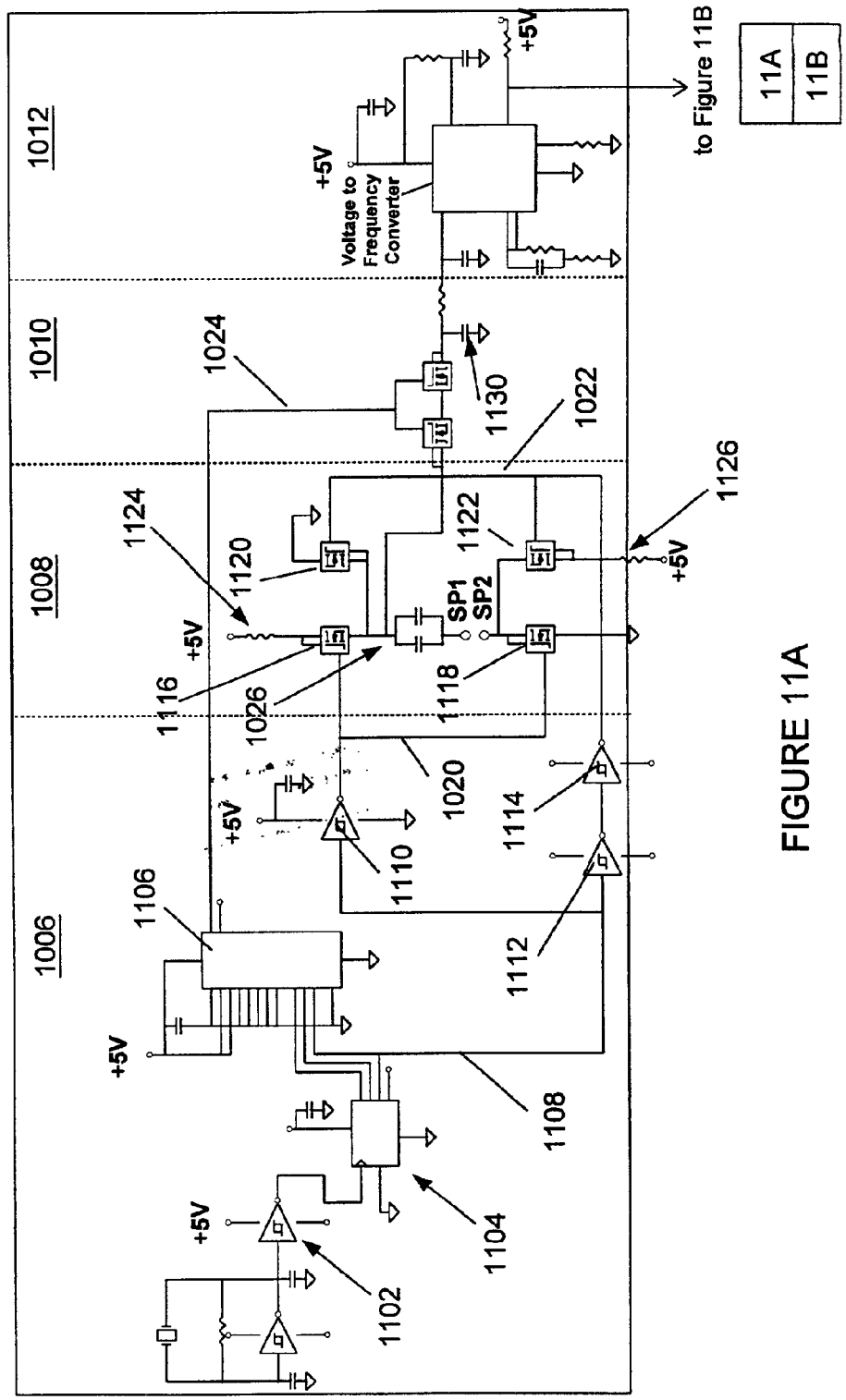
Figure 11B:
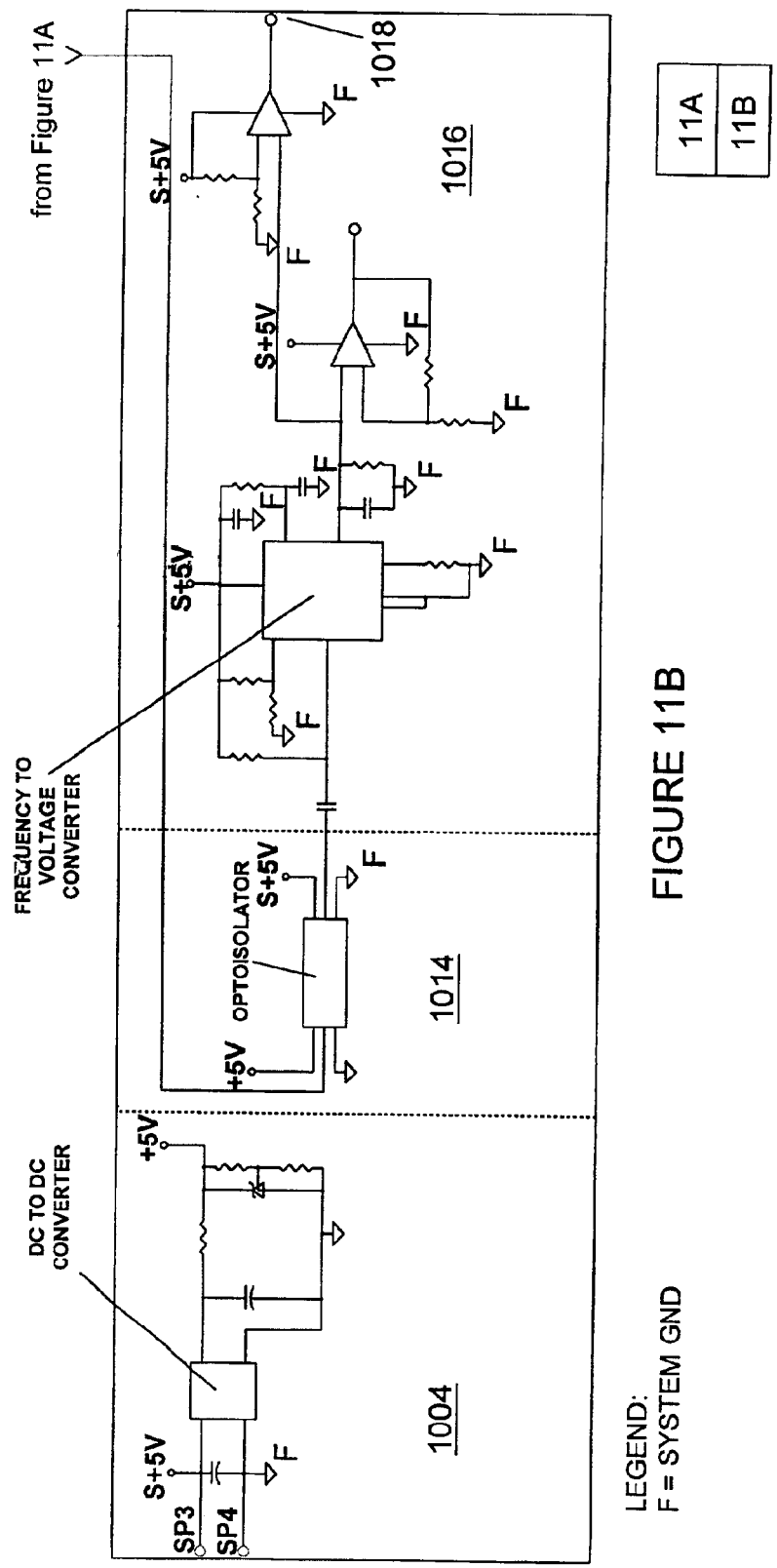

Referring to FIGS. 11A–11B, a specific example of a circuit for measuring probe resistance is illustrated In FIGS. 11A–11B, relative to FIG. 10, like elements are identified with like reference numerals. In particular, the circuitry in block 1004 of FIG. 11B is a DC-DC converter for receiving system power (S+5V) and ground, respectively, on terminals SP3 and SP4, and converting the same to a +5V DC driving signal which is substantially isolated from system power and ground.

Block 1006 comprises oscillator/timing circuitry for generating an AC driving signal, and timing signals for the sample/hold circuitry 1010. An oscillator 1102 generates a signal of about 1 MHz which is input to ripple counter 1104. The /8 output of the ripple counter, identified with numeral 1108, is a signal of about 125 kHz which is input to Schmitt trigger inverter 1110. The output of inverter 1110 on one or more signal lines 1020 forms the AC driving signal. An inverted form of the AC driving signal is provided on one or more signal lines 1022 by passing the /8 output of the ripple counter, identified with numeral 1108, to two back-to-back Schmitt trigger inverters 1112 and 1114.

The AC driving signal (and its inverse) drive bridge circuit 1008. Within bridge circuit 1008, two n-type FETs, identified with numerals 1116 and 1118, are driven by the AC driving signal, while two n-type FETs, identified with numerals 1120 and 1122, are driven by the inverse of the AC driving signal. A high precision reference resistor 1124 is coupled between FET 1116 and the isolated +5V signal produced by DC-DC converter 1004. Similarly, a high precision reference resistor 1126 of identical magnitude optionally can be coupled between FET 1122 and the isolated +5V signal produced by DC-DC converter 1004. (In contrast, FETs 1118 and 1120 are each coupled to isolated ground).

FETs 1116 and 1120 each can be coupled to first probe terminal (sp1 in 1008) through DC blocking capacitor 1026. Similarly, FETs 1118 and 1122 are each coupled to second probe terminal (sp2 in 1008). In this case, however, DC blocking capacitors are avoided since any DC bias current expected to be present at the second probe terminal sp2 is expected to be minimal or non-existent since the sample/hold circuitry 1012 is not coupled to it. Instead, the sample/hold circuitry 1012 only taps into the first probe terminal (sp1 in 1008) to take samples during the positive going pulses of the AC driving signal.

In operation, a probe is coupled to probe terminals (sp1 and sp2 in 1008) and a probe resistance is applied across the probe terminals (such as by immersing the probe in a mixture of a reaction medium and one or more reaction products). In one example, the probe comprises two conductive leads formed of any suitable conductive material (e.g., a metal (for example and without limitation, nickel), or the like).

As the bridge circuit is driven by the AC driving signal, an alternating voltage signal is produced on probe terminal (sp1 in 1008) which alternates between $V_P$ and 0 volts (where $V_P$ is defined as shown in expression (10) above, where $V_{REF}$ is +5V, and $R_{REF}$ is the resistance of the reference resistors 1124 and 1126 in FIG. 11A) at 125 kHz. Similarly, an alternating voltage signal can be produced on probe terminal (sp2 in 1008) which alternates between 0 and $V_P$ volts (where again $V_P$ is defined as shown in expression (10) above) at 125 kHz, and can be out-of-phase with that produced on probe terminal (sp1 in 1008) by 180°.

Sample/hold circuitry 1010 samples the voltage produced on terminal (sp1 in 1008) during the positive going pulses of the AC driving signal, when the voltage on terminal (sp1 in 1008) is equal to $V_P$. The samples, once taken, are stored in a storage capacitor 1130. The circuitry 1010 is driven by a timing signal provided on one or more signal lines 1024 which directs the sampling operation to occur during a ¼ cycle sampling period approximately centered on the positive going pulses of the AC driving signal. This timing signal is provided by multiplexor 1106. The sampling period is thus deferred relative to the rising edges of the AC driving signal by about a ⅛ cycle period, and are advanced relative to the failing edges of the AC driving signal also by about a ⅛ cycle period. This has been determined to be sufficient to avoid having any inductive or capacitive effects which could occur at the pulse edges from unduly influencing the probe measurements, and also ensures that the probe measurements are approximately purely resistive.

A voltage signal representative of the samples taken by sample/hold circuitry 1010 is then input to voltage-to-frequency conversion circuitry 1012. This circuitry modulates the frequency of a digital signal responsive to the input voltage signal (the relationship between frequency and voltage is approximately linear). The modulated digital signal is then input to optoisolator 1014 which outputs a modulated digital signal which is a mirror image (in or out of phase) of the frequency of the input modulated digital signal and is substantially isolated from the input modulated digital signal. The output of the optoisolator 1014 is input to frequency-to-voltage conversion circuitry 1016, which converts the modulated frequency of the digital signal back into a voltage signal which is output on one or more signal lines 1018 (again, the relationship between frequency and voltage is approximately linear). (The circuitry in blocks 1012, 1014, and 1016 is conventional and need not be explained in great detail). The end result is that the voltage signal output on one or more signal lines 1018 is representative of the probe resistance.

To avoid electroplating of the probe in this implementation, an AC (instead of DC) driving signal is utilized. In one example, the frequency of the AC driving signal varies in the range(s) greater than about 80 to about 120 kHz, and in another example, this frequency is greater than about 100 kHz or more. Moreover, the reference voltage (+5V) and reference resistance (127 Ω) in this example may be varied depending on the expected probe resistance to achieve a desired measurement range.

In an additional aspect, the invention pertains to fuel cell subsystems. As utilized herein, "fuel cell subsystems" include without limitation subsystems comprising system(s) for measuring available energy in a metal fuel cell in an amount in the range(s) from about 1 to about 100 or more, each independently prepared in accordance with the invention, and one or more other components of a metal fuel cell. These components include without limitation cathode (s) (e.g., the cathode found in U.S. patent application Ser. No. 10/050,901, filed Oct. 19, 2001, entitled "POLYMER COMPOSITES, ELECTRODES AND SYSTEMS THEREOF", which is hereby fully incorporated by reference herein as though set forth in full, anode(s) (e.g., the recirculating anode found in U.S. patent application Ser. No. 10/060,965, filed Oct. 19, 2001, entitled "RECIRCULATING ANODE", which is hereby fully incorporated by reference herein as though set forth in full, separator(s), electrolyte, pellet or fuel delivery/feeding, cell stack, cell frame, cooling mechanism, air management mechanism, optional fuel regenerator, electronics/control system, and the like, and suitable combinations of any two or more thereof. Although these fuel cell subsystems can comprise system(s) for measuring available energy in a metal fuel cell according to the invention, the specific number and/or types of system (s) for measuring available energy in a metal fuel cell can be varied depending on the intended use or application of the fuel cell subsystem. Thus, for use in fuel cells and use to test operability of various fuel cell components, these fuel cell subsystems can vary as discussed above, and, in one non-limiting example, can comprise at least one system for measuring available energy in a metal fuel cell.

In a further aspect, the invention comprises novel fuel cells. Typically, these fuel cells comprise at least one system (s) for measuring available energy in a metal fuel cell in accordance with the invention. The specific number and/or types of system(s) for measuring available energy in a metal fuel cell can be varied depending on the intended use or application of the fuel cell. Fuel cells can be customized according to the desired load being serviced. For example, such loads include, without limitation, lawn & garden equipment; radios; telephone; targeting equipment; battery rechargers; laptops; communications devices; sensors; night vision equipment; camping equipment (including without limitation, stoves, lanterns, lights, and the like); lights; vehicles (including without limitation, cars, recreational vehicles, trucks, boats, ferries, motorcycles, motorized scooters, forklifts, golf carts, lawnmowers, industrial carts, passenger carts (airport), luggage handling equipment (airports), airplanes, lighter than air crafts (e.g., blimps, dirigibles, and the like), hovercrafts, trains (e.g., locomotives, and the like), and submarines (manned and unmanned); torpedoes; security systems; electrical energy storage devices for renewable energy sources (e.g., solar-based, tidal-based, hydro-based, wind-based, and the like); many other types of electrical devices, equipment for which a primary and/or backup power source is necessary or desirable to enable the equipment to function for its intended purpose, military-usable variants of above, and the like; and suitable combinations of any two or more thereof.

Figure 12:
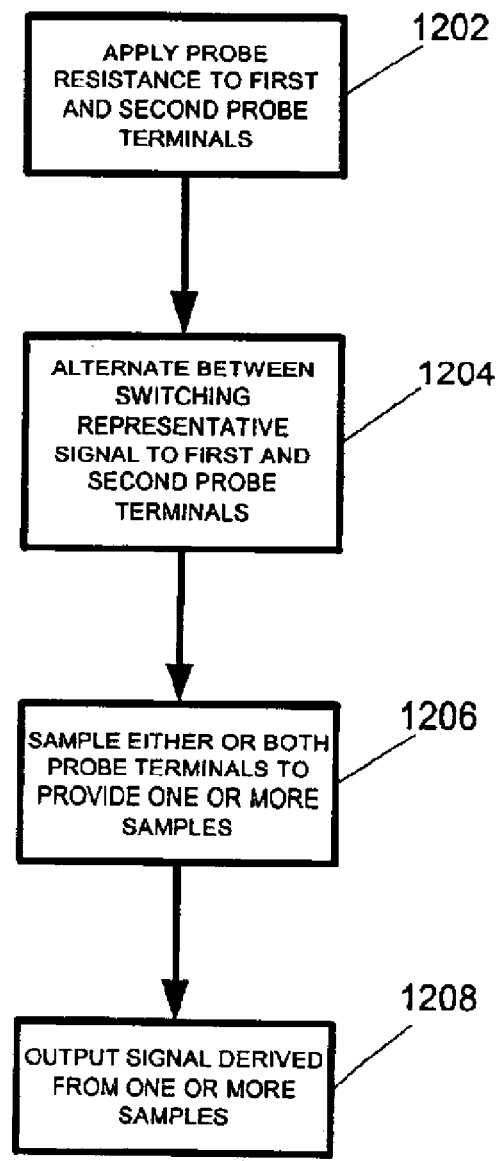
FIG. 12 is a flowchart illustrating one embodiment of a method for measuring probe resistance according to the invention.

Referring to FIG. 12, a flowchart of one embodiment of a method of measuring probe resistance is illustrated. In step 1202, the method comprises applying a probe resistance to first and second probe terminals. In one application, this step involves immersing a probe coupled to the probe terminals into a mixture of a reaction medium and one or more reaction products in a metal fuel cell.

From step 1202, the method proceeds to step 1204. In step 1204, a signal representative of the probe resistance is alternately switched between first and second probe terminals. In one embodiment, this step comprises applying a voltage to the first probe terminal which alternates between 0 and $V_P$ volts at the frequency of an AC driving signal, and also applying a voltage to the second probe terminal which alternates between 0 and $V_P$ volts at the frequency of the AC driving signal, but which is out of phase by 180° with the signal applied to the first probe terminal.

From step 1204, the method proceeds to step 1206. In step 1206, the signal representative of the probe resistance is sampled from either or both of the first and second probe terminals to obtain one or more samples. In one embodiment, a voltage representative of the probe resistance is applied to the first probe terminal during positive going pulses of the AC driving signal, and a voltage representative of the probe resistance is applied to the second probe terminal during negative going pules of the AC driving signal. In this embodiment, step 1206 may comprise sampling the voltage at the first probe terminal during the positive going pulses of the AC driving signal and/or sampling the voltage of the second probe terminal during the negative going pulses of the AC driving signal. To avoid undue influence of any inductive or capacitive effects which may occur at the rising and falling edges of the pulses of the AC driving signal, and to ensure that the probe measurements are approximately purely resistive, the time periods during which sampling occurs may be approximately centered on the positive and negative going pulses respectively and delayed or advanced relative to the rising or falling edges of the pulses.

From step 1206, the method proceeds to step 1208. In step 1208, a signal representative of one or more of the samples (and also representative of the probe resistance) is derived from one or more of the samples and output.

While various embodiments of the invention have been described, it will be apparent to those of ordinary skill in the art that many more embodiments and implementations are possible that are within the scope of this invention.

What is claimed is:

1. A method of measuring available energy in a metal fuel cell in which one or more reaction products of an electrochemical reaction occurring in the cell is dissolved in a reaction medium to form a mixture having at least one electrical property, the method comprising:

measuring at least one of the electrical property(ies) of the mixture; and deriving an indication of the available energy of the fuel cell from the measured electrical property(ies).

2. The method of claim 1 wherein the fuel cell comprises a zinc fuel cell.

3. The method of claim 2 wherein the reaction medium comprises potassium hydroxide.

4. The method of claim 3 wherein the reaction product comprises zincate ion.

5. The method of claim 1 wherein the at least one electrical property(ies) comprises resistance.

6. The method of claim 5 wherein the resistance of the mixture is measured with a probe.

7. The method of claim 6 wherein the step of measuring the resistance of the mixture comprises immersing the probe in the reaction medium to measure the probe resistance.

8. The method of claim 5 wherein the step of deriving an indication of the available energy of the fuel cell comprises estimating the concentration of the reaction product in the reaction solution from the measured resistance, and deriving the available energy of the fuel cell from the estimated concentration.

9. The method of claim 5 wherein the step of deriving an indication of the available energy of the fuel cell comprises determining the conductivity of the reaction product in the reaction solution from the measured resistance, estimating the concentration of the reaction product in the reaction solution from the conductivity as determined from the measured resistance, and deriving the available energy of the fuel cell from the estimated concentration.

* * * * *